United States Patent
Dyke

(10) Patent No.: US 9,008,082 B2
(45) Date of Patent: Apr. 14, 2015

(54) HANDLING DATA PACKETS RECEIVED AT A ROUTING NODE

(75) Inventor: Eric Dyke, Verdun (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 387 days.

(21) Appl. No.: 12/632,008

(22) Filed: Dec. 7, 2009

(65) Prior Publication Data

US 2011/0134920 A1 Jun. 9, 2011

(51) Int. Cl.
*H04L 12/28* (2006.01)
*H04L 12/773* (2013.01)
*H04L 12/747* (2013.01)
*H04L 29/06* (2006.01)
*H04J 1/16* (2006.01)

(52) U.S. Cl.
CPC .............. *H04L 45/60* (2013.01); *H04L 45/742* (2013.01); *H04L 69/22* (2013.01); *H04L 2212/0025* (2013.01); *H04L 69/16* (2013.01)

(58) Field of Classification Search
USPC .................................. 370/252, 389, 392, 401
See application file for complete search history.

(56) References Cited

U.S. PATENT DOCUMENTS

| | | | | |
|---|---|---|---|---|
| 6,970,939 | B2 * | 11/2005 | Sim ............................... | 709/236 |
| 2004/0264468 | A1 * | 12/2004 | Horton et al. ................. | 370/392 |
| 2007/0121615 | A1 * | 5/2007 | Weill et al. .................... | 370/389 |
| 2010/0316052 | A1 * | 12/2010 | Petersen ....................... | 370/392 |

FOREIGN PATENT DOCUMENTS

| | | |
|---|---|---|
| EP | 1 317 115 A2 | 6/2003 |
| WO | 2007/064585 A2 | 6/2007 |

OTHER PUBLICATIONS

International Search Report from corresponding application PCT/IB2010/055647.

* cited by examiner

*Primary Examiner* — John Pezzlo
(74) *Attorney, Agent, or Firm* — Alex Nicolaescu; Ericsson Canada Inc.

(57) ABSTRACT

A method applied in a routing node, and a forwarding engine implemented in a routing node, are provided for handling data packets received at the routing node. A N-tuple comprising N elements is extracted from a first header of a data packet. A default meta-field is added to the N elements, providing a N+1-tuple. The N+1-tuple is used to make a first lookup of inspection rules. The default meta-field makes the inspection rules apply to the first header. The data packet is handled according to a result of the first lookup, wherein a possible outcome is a finding of a second header within the data packet. If a second header is found, a new meta-field value is set and a second lookup is made. The second lookup of the inspection rules is made according to N elements from the second header and the new value of the meta-field.

21 Claims, 4 Drawing Sheets

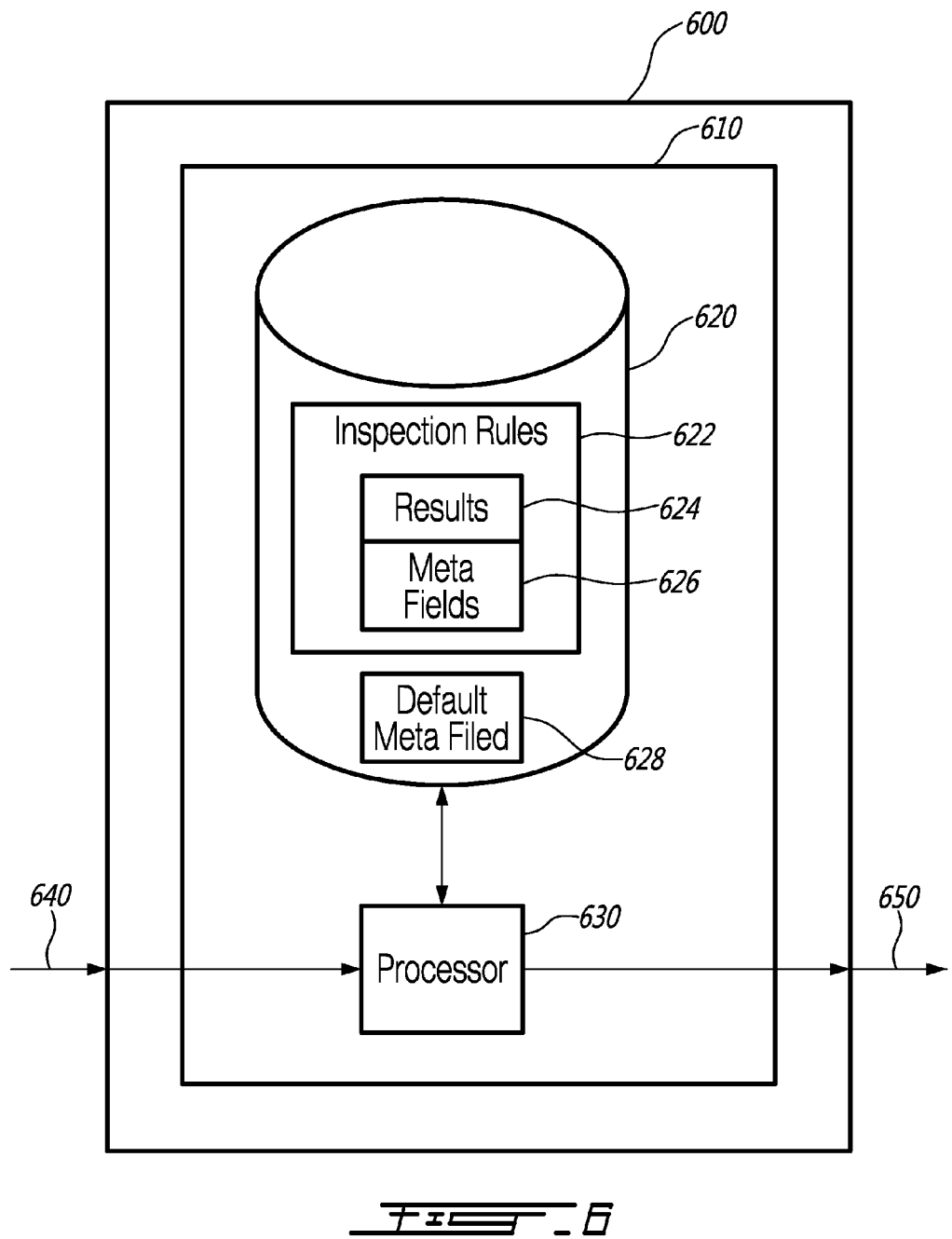

HANDLING DATA PACKETS RECEIVED AT A ROUTING NODE

TECHNICAL FIELD

The present invention relates generally to the field of communications and, more specifically, to a method and a forwarding engine for handling data packets received at a routing node.

BACKGROUND

Today's routers, servers, gateways and like network nodes receive, process and forward data packets at a very fast rate. In a typical router, a forwarding engine may comprise rules to apply specific actions to packets that match certain criteria. Typically, such rules are applied to parameters comprised in an internet protocol (IP) data packet header. FIG. 1 (Prior Art) shows a representation of an IP version 4 data packet. The IPv4 data packet 100 comprises a variable length data 110 portion, also called payload, and a header 120. The header comprises many fields; for the purposes of the present description, important fields comprise a source address 122, a destination address 124 and a protocol 126. The protocol 126 may have different values such as transmission control protocol (TCP), user datagram protocol (UDP), IP-in-IP (tunneling), and the like. If the protocol is TCP or UPD for example, a TCP or UDP header is added to the packet. FIG. 2 is a prior art representation of a TCP header. Important elements of the TCP header 200 comprise a source port 210 and a destination port 220. A typical router applies forwarding rules to a N-tuple comprising N elements extracted from a data packet. A 3-tuple may comprise the destination address 124, the source address 122, and the protocol identifier 126. A 5-tuple may comprise the same elements to which are added the destination port 220 and the source port 210. FIG. 3 is a prior art representation of a 5-tuple. The 5-tuple 300 comprises the source address 122, the destination address 124, the source port 210, the destination port 220 and the protocol 126. These 5 elements are not found in the order shown on FIG. 3 within a typical data packet. The 5-tuple is rather an easy-to-use representation of the elements that are used in a forwarding engine for making routing decisions.

Forwarding engines are generally capable of taking routing decisions based on a first, or outer header of a data packet. If a data packet has been tunneled by use of IP-in-IP, the data packet comprises a first (outer header) and an enlarged payload. The enlarged payload further comprises an inner header and an original payload. Making a forwarding engine inspect a plurality of headers within a packet would slow down its processing.

SUMMARY

There would be clear advantages of having a method and a forwarding engine for efficiently handling data packets.

It is therefore a broad object of this invention to provide a method and a forwarding engine for handling data packets received in a routing node.

A first aspect of the present invention is directed a method of handling a data packet received in a routing node. The method starts with adding a default meta-field to elements of a first header of the data packet. A first lookup of inspection rules is performed, wherein the default meta-field makes the inspection rules use the elements of the first header. If no second header is found in the data packet, the data packet is handled based on a result of the first lookup. If a second header is found in the data packet, the meta-field is modified based on the result of the first lookup. Elements of the second header and the modified meta-field are used to perform, in the routing node, a second lookup of the inspection rules.

A second aspect of the present invention is directed to a forwarding engine, implemented in a routing node. The forwarding engine handles data packets received at the routing node. The forwarding engine comprises a database that stores inspection rules, each inspection rule comprising a result. The forwarding engine also comprises a processor. The processor adds a default meta-field to elements of a first header of a data packet received at the routing node. The processor performs a first lookup of the inspection rules, wherein the default meta-field makes the processor apply the inspection rules to the elements of the first header. If no second header is found in the data packet, the processor handles the data packet based on a result of the first lookup. If a second header is found in the data packet, the processor modifies the meta-field based on the result of the first lookup and uses elements of the second header as well as the modified meta-field to perform a second lookup of the inspection rules.

BRIEF DESCRIPTION OF THE DRAWINGS

For a more detailed understanding of the invention, for further objects and advantages thereof, reference can now be made to the following description, taken in conjunction with the accompanying drawings, in which:

FIG. 6 shows an exemplary forwarding engine, implemented in a routing node, according to an aspect of the present invention.

DETAILED DESCRIPTION

The innovative teachings of the present invention will be described with particular reference to various exemplary uses and aspects of the preferred embodiment. However, it should be understood that this embodiment provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the description of the figures, like numerals represent like elements of the invention.

The present invention provides a method and a forwarding engine for handling data packets in a routing node. When the data packet arrives at the routing node, it may be an ordinary data packet, for example an IP version 4 or an IP version 6 packet comprising a header and a payload. It may be a tunneled IP packet comprising an outer header and an enlarged payload consisting of an inner header and of an original payload. The forwarding engine of the present invention is capable of limiting its evaluation of a data packet on a basis of a single header in a single pass. If the payload of data packet comprises an inner header, indicating for example that the data packet has been encapsulated in a previous node where tunneling originated, the data packet is looped back to the forwarding engine for a second evaluation of the inner header, in a second pass. In order to ensure that successive evaluations progress towards a complete evaluation of the data packet, a default value is attached to the data packet as it first arrives at the routing node. Based on this default value, the forwarding engine analyses elements of a first header. If the forwarding engine detects an inner header and thereby determines that looping back is required, it replaces the default value with a new value representative of a result of the first evaluation. As the data packet is looped back to the forwarding engine, the second evaluation is made on a basis of the inner header and of the new value.

Figure 1:
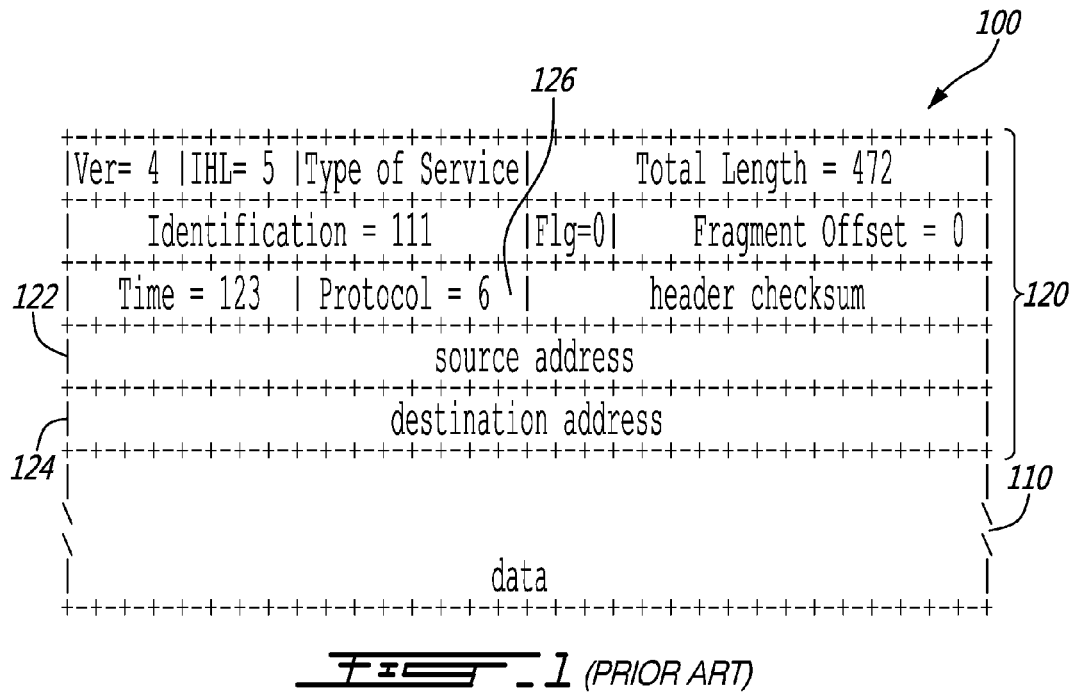
FIG. 1 is a prior art representation of an IP version 4 data packet.
Figure 2:
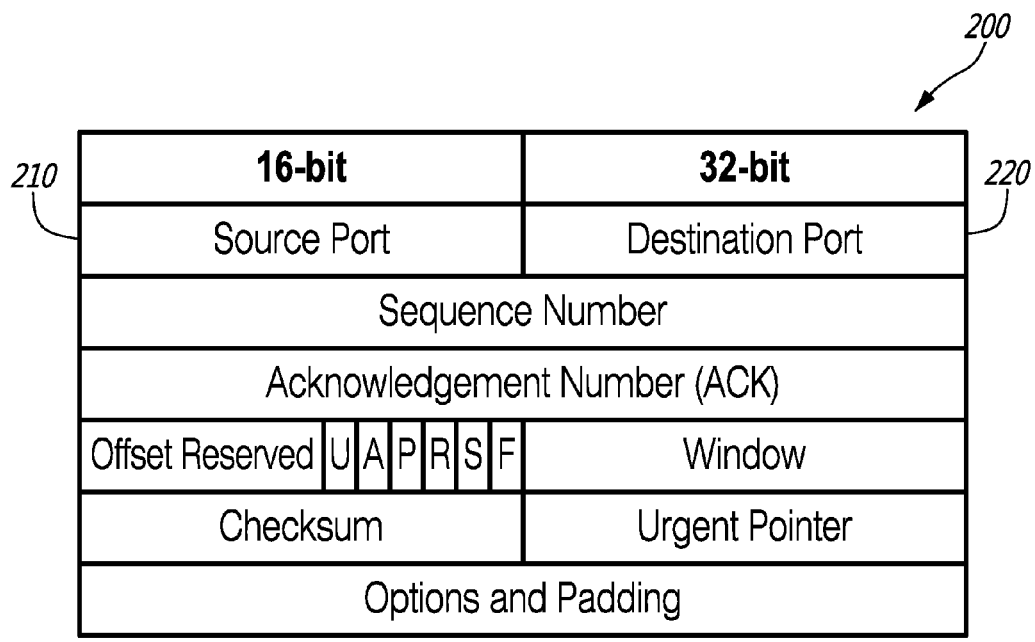
FIG. 2 is a prior art representation of a TCP header.
Figure 3:
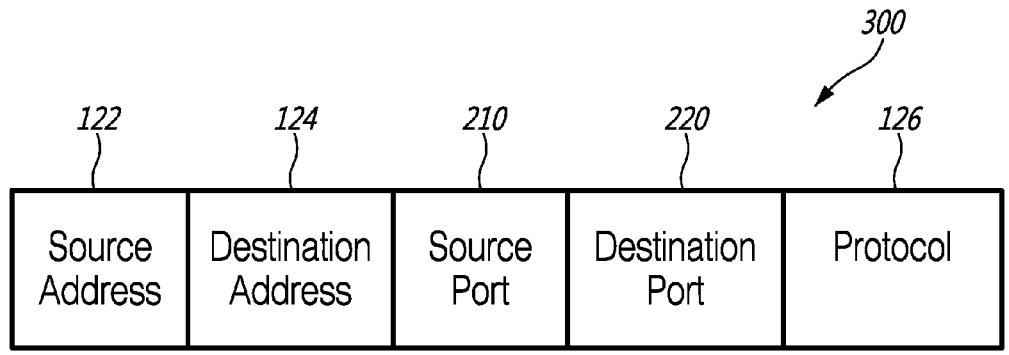
FIG. 3 is a prior art representation of a 5-tuple.
Figure 4:
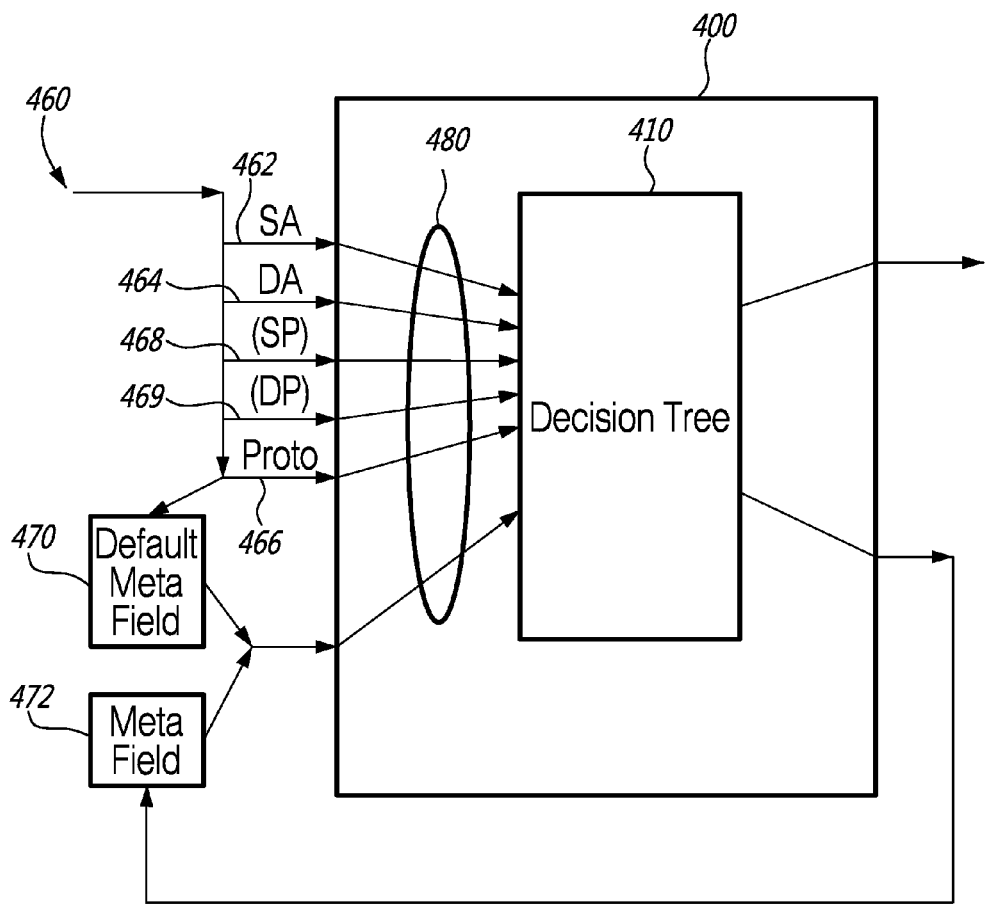
FIG. 4 shows an embodiment of a forwarding engine, as per some teachings of the present invention.

Reference is now made to the Drawings in which FIG. 4 shows an embodiment of a forwarding engine, as per some teachings of the present invention. The forwarding engine 400 comprises a decision tree 410 that further comprises a set of inspection rules (not shown). A data packet 460 is received at an input of a routing node (not shown on FIG. 4) in which the forwarding engine 400 is implemented. Several elements, or header fields, are extracted from a first header in the data packet 460. These elements are usable in routing the data packet. The elements comprise, for example, a source address (SA) 462, a destination address (DA) 464, a protocol 466 and, if present, a source port (SP) 468 and a destination port (469). The SA 462, DA 464 and protocol 466 may form a 3-tuple for use by the forwarding engine 400. If the SP 468 and the DP 469 are present, they are added to the SA 462, DA 464 and protocol 466 to form a 5-tuple for use by the forwarding engine 400. Those skilled in the art may realize that the SA 462, the DA 464 and the protocol 466 may be extracted from an IP header, at layer 3, while the SP 468 and the DP 469 may be extracted from a transaction control protocol (TCP) header or from another similar header, at layer 4. In the context of the present description, the term "header" is to be understood as a generic header, or compound of multi-layer headers, that is added to a data packet payload. In some embodiments, depending for example on a type of network in which the routing node is implemented, a number "N" of elements in a "N-tuple" may be present, for use by the forwarding engine. Regardless of the actual number of elements in the N-tuple, a N+1-tuple 480 is generated by adding a default meta-field 470 to the N-tuple. The N+1-tuple 480 is applied to the decision tree 410. Looking up of the inspection rules in the decision tree 410 may lead to various types of decisions. One example of a decision may be to simply forward the data packet according to the DA 464. Another example may be to stop any further processing of the packet and drop said packet, for example based on the SA 462 being part of a black-list, as determined by the inspection rules. If the decision tree determines that the data packet 460 has been tunneled and encapsulated and thus comprises a second, inner header, the decision may be to apply the data packet 460 once more to the decision tree 410. For this, the decision tree 410 provides a result of the look up of the inspection rules, based on the N+1-tuple 480, assigns a new value 472 to the meta-field for representing the result, and may determine an offset value that designates a position of the inner header within the data packet 460. The forwarding engine 400 loops back the data packet 460, in which a modified N+1-tuple 480 now comprises N elements obtained from the inner header in addition to the new meta-field value 472. The modified N+1-tuple 480 is evaluated again by the decision tree 410. A result of the second evaluation may, again, be to forward, drop, or loopback once more the data packet 460.

A first example of an inspection rule may be:

"If the data packet protocol is UDP and if a source address in the header is 'User_K', then the result is to forward the data packet towards address W.X.Y.Z".

The first exemplary inspection rule would apply even if a destination address in the data packet header differs from the specified address W.X.Y.Z.

A second example of an inspection rule may be:

"If the protocol is 'GTP tunnel over IP', if the IP source address is 'Tunnel_X_Source, if the IP destination address is 'Tunnel_X_Destination', then the result is to set an offset equal to 'IP header length plus GTP header length', set the meta-field value to 'GTP_Tunnel_X_found', and loop back the data packet".

In the case of the second exemplary rule, upon a second lookup of the inspection rules, the meta-field value could lead the forwarding engine to drop the data packet if it is detected that the data packet has been tunneled twice.

Of course, the above exemplary inspection rules are solely for the purposes of illustrating aspects of the method of the present invention and should not be considered as limiting the invention. A decision tree may comprise a large number of inspection rules of variable complexity, designed for specific purposes of a given routing node. In the context of the present invention, the forwarding engine may be implemented in many types of routing nodes. Exemplary routing nodes may comprise a router, a server, a gateway, a home agent, a foreign agent, a GGSN (gateway GPRS support node), an asynchronous transfer mode (ATM) switch, and the like.

Figure 5:
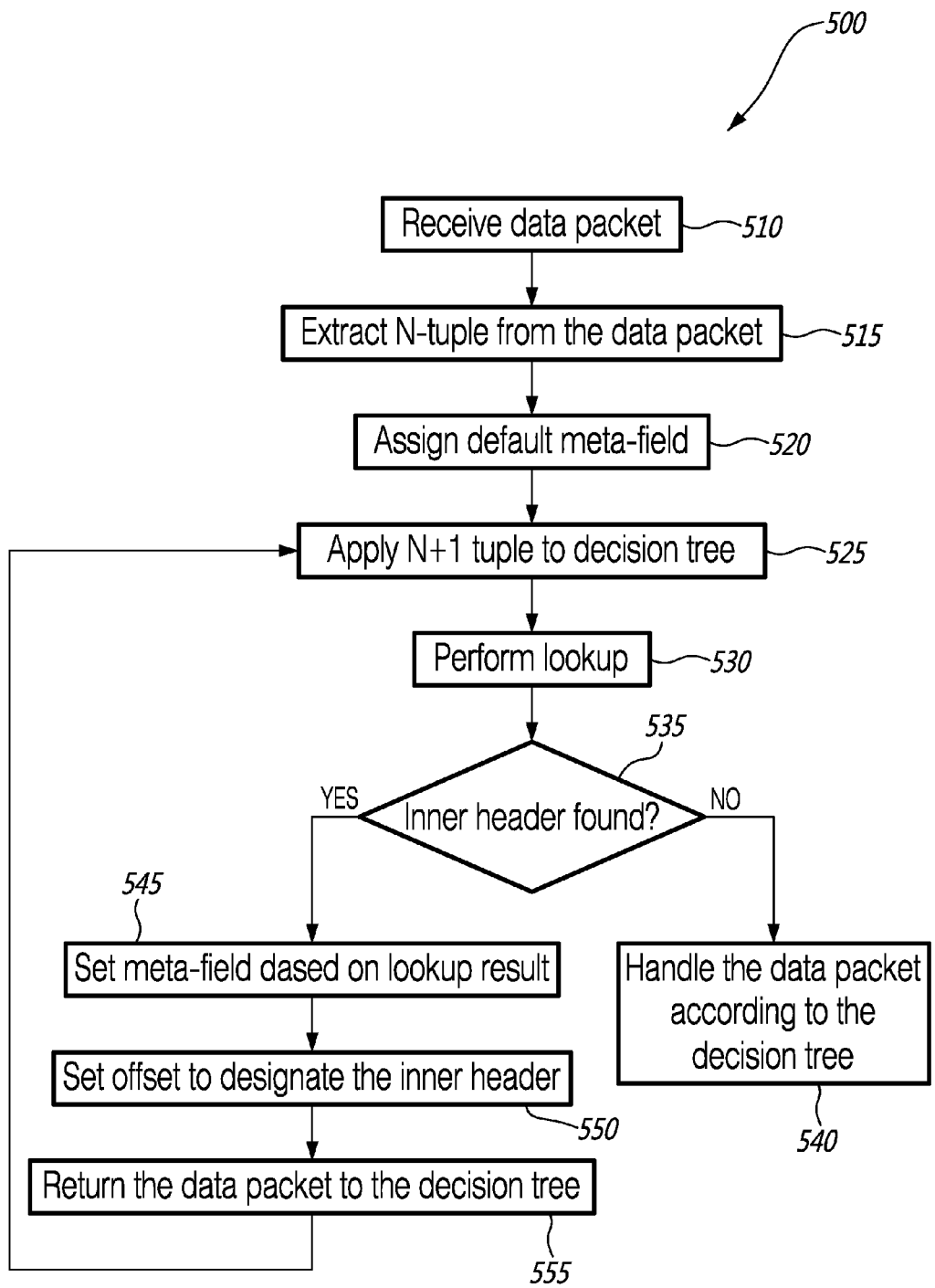
FIG. 5 shows a flow chart depicting exemplary steps of the method of the present invention.

FIG. 5 shows a flow chart depicting exemplary steps of the method of the present invention. A sequence 500 describes steps executed in a forwarding engine implemented in a routing node. The sequence 500 is initiated when a data packet arrives at the routing node, step 510. A N-tuple, comprising for example 3 elements including a source address, a destination address and a protocol forming a 3-tuple, is extracted from a first header of the data packet, step 515. In some embodiments, the N-tuple is a 5-tuple comprising the elements of the 3-tuple to which are added a source port and a destination port. At step 520, a default meta-field is assigned, producing a N+1-tuple. The value of the default meta-field may be zero, or any value that a decision tree within the forwarding engine of the present invention recognizes as an initial default value for a newly received data packet. The format of the meta-field may vary in various embodiments; because the meta-field is only used within the routing node, it is not required to have any specific format usable beyond the routing node. An exemplary embodiment of the meta-field may comprise a 32-bit field allowing for a large number of possible values in addition to the default value. At step 525, the N+1-tuple is applied to the decision tree. At step 530, a lookup of inspection rules in the decision tree is made based on the elements of the N+1-tuple. As a part of the lookup of inspection rules, analysis of the first header determines whether or not the data packet comprises an inner header, distinct form the first header, step 535. Finding an inner header indicates that the data packet has been tunneled and encapsulated prior to its arrival at the routing node. The first header is in that case an outer header, added at a tunnel origin. In a case where no inner header is found, the data packet is handled according to a result of the inspection rules lookup, at step 540. Handling of the data packet at step 540 depends on the result of the inspection rules and, if no second header was found, depends solely on an analysis of the N-tuple and of the default meta-field, in the first lookup. The handling of step 540 may comprise forwarding the data packet towards the destination address, forwarding the data packet towards an address determined by the inspection rules, or dropping the data packet. If a result of the first lookup is that an inner header is found at step 535, handling of the data packet starts with modifying the meta-field by assigning a new value according to a result of the inspection rules, step 545. In some embodiments, an offset may be calculated at step 550 to designate a starting point of the inner header within the data packet. The data packet, the offset (if available) and the modified meta-field are returned to the decision tree, step 555. Step 525 of applying a N+1-tuple is executed again, though this time, the N elements are extracted from the inner header. A second lookup of the inspection rules follows at step 530. In the second lookup, as the N elements from the inner header usually differ from those of the first (outer) header and as the meta-field has been modified to a new value, a second result is expected to differ from the previous one. Regardless, a possible outcome may be to find yet another header within the data packet, which may have been tunneled twice. As a result, following steps 530 and 535, the sequence 500 may either end at step 540 or proceed once more with steps 545-555, returning to step 525. A number of actual iterations between steps 525 and 555 should match a number of encapsulation levels of the data packet, prior to its arrival at the routing node. Handling of the data packet at step 540 is then made on a basis of a N-tuple of an innermost header and on a meta-field that represents results from previous lookups.

An exemplary construction of a forwarding engine will now be described by reference to FIG. 6, which shows an exemplary forwarding engine, implemented in a routing node, according to an aspect of the present invention. The forwarding engine 610 is a part of a routing node 600. The forwarding engine comprises a database 620 and a processor 630. The database 620 database stores inspection rules 622, each inspection rule 622 comprising a result 624 and a meta-field 626 associated with the result 624. A default meta-field 628 is also present in the forwarding engine 610 and may be stored in the database 620. The database 620 may be implemented by use of a volatile memory, or may alternatively be constructed from a non-volatile memory, or persistent memory, that can be electrically erased and reprogrammed and that may be implemented, for example, as a flash memory or as a data storage module. The processor 630 may be any commercially available, general purpose processor, or may be specifically designed for operation in the routing node 600. The processor 630 may be operable to execute processes related to the forwarding engine 610 of present invention in addition to numerous other processes of the routing node 600. The routing node 600 also comprises several other elements (not shown) for sending and receiving data packets and for receiving configuration data, as is well-known in the art.

In operation, a data packet is received at an input 640 of the routing node 600 and presented to the processor 630. The processor 630 adds the default meta-field 628 to elements of a first header of the data packet. The processor 630 performs a first lookup of the inspection rules 622, wherein the default meta-field 628 makes the processor 630 apply the inspection rules 622 to the elements of the first header. If no second, inner header is found in the data packet, the processor 630 handles the data packet based on a result 624 of the first lookup. If a second header is found in the data packet, the processor 630 modifies the meta-field based on the result 624 of the first lookup, using the meta field 626 associated with the result 624, and uses elements of the second header as well as the modified meta-field 626 to perform a second lookup of the inspection rules 622. In some embodiments, the processor 630 may calculate an offset for indicating where a start of the second header may be found in the data packet. If there is a second header in the data packet, the processor 630 performs a second lookup of the inspection rules 622, wherein the modified meta-field 626 and elements of the second header are used to apply the inspection rules 622. If provided, the offset facilitates the second lookup by pointing to the start of the second header. After the first header has been inspected, if there is no second header, or after a last header has been inspected, a last result 624 is applied to the data packet by the processor 630. The last result 624 may lead the processor 630 to forward the data packet, for example to a destination address found in one of the headers of the data packet or to another address provided by the last result 624. In other cases, the last result 624 may lead the processor 630 to drop the data packet. If the data packet is to be forwarded, it is transferred by the processor 630 to an output 650 of the routing node.

In addition, the routing node 600 and its forwarding engine 610 are capable of performing the features of the various embodiments described in FIGS. 4 and 5.

Although several aspects of the preferred embodiment of the method and of the forwarding engine of the present invention have been illustrated in the accompanying Drawings and described in the foregoing Detailed Description, it will be understood that the invention is not limited to the embodiments disclosed, but is capable of numerous rearrangements, modifications and substitutions without departing from the teachings of the invention as set forth and defined by the following claims.

The invention claimed is:

1. A method of handling a data packet received in a routing node, the method comprising the steps of:
    creating an N+1-tuple based on N elements of a first header of the data packet and a meta-field having an initial value; and
    applying, in the routing node, inspection rules based solely on inspection of the N+1-tuple, to determine a processing of the data packet, wherein the processing associated with at least one of the inspection rules comprises:
        modifying the N+1-tuple by changing the meta-field to a different value, indicative of a second header encapsulated in a payload of the data packet, and by populating the remaining fields of the N+1-tuple with N elements from the second header of the data packet; and
        re-applying, in the routing node, the inspection rules based solely on inspection of the modified N+1-tuple, to determine the processing of the data packet.

2. The method of claim 1, wherein the processing performed by applying or re-applying the inspection rules comprises forwarding the data packet.

3. The method of claim 2, wherein forwarding of the data packet is made according to a destination address comprised in the first header.

4. The method of claim 2, wherein forwarding of the data packet is made towards an address determined by the inspection rules.

5. The method of claim 1, wherein the processing performed by applying or re-applying the inspection rules comprises dropping the data packet.

6. The method of claim 1, wherein:
    the routing node is selected from the group consisting of a router, a server, a gateway, a home agent, a foreign agent, an ATM switch, and a gateway GPRS support node.

7. The method of claim 1, wherein:
    the N elements of the first header comprise source and destination addresses of the data packet; and
    the N elements of the second header comprise source and destination addresses of a tunneled data packet.

8. The method of claim 1, the action of populating comprises:
    determining an offset of the data packet leading to the second header; and using the offset to determine a position of the N elements of the second header.

9. The method of claim 1 wherein the second header is associated with an encapsulated data packet.

10. The method of claim 1 wherein applying, in the routing node, the inspection rules based solely on inspection of the N+1-tuple comprises determine that the data packet includes the second header.

11. The method of claim 1 wherein the data packet is a tunneled Internet Protocol (IP) packet formed of the first header as an outer header and an enlarged payload including the second header and an original payload.

12. A forwarding engine, implemented in a routing node, for handling data packets received at the routing node, the forwarding engine comprising:
a database for storing inspection rules for determining a processing of a data packet; and
a processor configured to:
create an N+1-tuple based on N elements of a first header of a data packet received at the routing node and a meta-field having an initial value; and
apply the inspection rules based solely on inspection of the N+1-tuple, to determine a processing of the data packet, wherein the processing associated with at least one of the inspection rules comprises;
modifying the N+1-tuple by changing the meta-field to a different value indicative of a second header encapsulated in a payload of the data packet, and by populating the remaining fields of the N+1-tuple with N elements from the second header of the data packet; and
re-applying the inspection rules based solely on inspection of the modified N+1-tuple, to determine the processing of the data packet.

13. The forwarding engine of claim 12, wherein at least one of the inspection rules causes the processor to forward the data packet.

14. The forwarding engine of claim 13, wherein the processor forwards the data packet according to a destination address comprised in the first header.

15. The forwarding engine of claim 13, wherein the processor forwards the data packet towards an address determined by the inspection rules.

16. The forwarding engine of claim 12, wherein at least one of the inspection rules causes the processor to drop the data packet.

17. The forwarding engine of claim 12, wherein the processor is further configured to:
determine an offset of the data packet leading to the second header; and
use the offset to determine a position of the N elements of the second header.

18. The forwarding engine of claim 12, wherein:
the N elements of the first header comprise source and destination addresses of the data packet; and
the N elements of the second header comprise source and destination addresses of a tunneled data packet.

19. The forward engine of claim 12, wherein the second header is associated with an encapsulated data packet.

20. The forward engine of claim 12, wherein applying, in the routing node, the inspection rules based solely on inspection of the N+1-tuple comprises determine that the data packet includes the second header.

21. The forward engine of claim 12, wherein the data packet is a tunneled Internet Protocol (IP) packet formed of the first header as an outer header and an enlarged payload including the second header and an original payload.

* * * * *